(12) United States Patent
Mayer et al.

(10) Patent No.: US 6,833,678 B2
(45) Date of Patent: Dec. 21, 2004

(54) CIRCUIT ARRANGEMENT FOR OPERATING DISCHARGE LAMPS

(75) Inventors: Siegfried Mayer, Moosinning (DE); Arwed Storm, Dachau (DE)

(73) Assignee: Patent Treuhand Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/646,870

(22) Filed: Aug. 25, 2003

(65) Prior Publication Data

US 2004/0080283 A1 Apr. 29, 2004

(30) Foreign Application Priority Data

Sep. 4, 2002 (DE) ......................................... 102 41 327

(51) Int. Cl.⁷ .............................................. H05B 41/16
(52) U.S. Cl. .................. 315/247; 315/209 R; 315/224; 315/291; 315/240; 315/DIG. 5
(58) Field of Search ............................ 315/247, 209 R, 315/224, 225, 240, 291, 325, DIG. 5, DIG. 7; 363/34, 37, 98, 108, 131

(56) References Cited

U.S. PATENT DOCUMENTS

| | | | | |
|---|---|---|---|---|
| 5,498,936 A | * | 3/1996 | Smith ......................... | 315/247 |
| 5,510,974 A | * | 4/1996 | Gu et al. ..................... | 363/134 |
| 5,583,398 A | * | 12/1996 | Dellamano et al. ......... | 315/247 |
| 5,598,326 A | * | 1/1997 | Liu et al. ...................... | 363/34 |
| 6,316,883 B1 | * | 11/2001 | Cho et al. .................... | 315/247 |
| 6,677,716 B2 | * | 1/2004 | Rudolph et al. ............. | 315/224 |

* cited by examiner

*Primary Examiner*—Haissa Philogene

(57) ABSTRACT

Circuit arrangement for operating discharge lamps (LP), having the following features: A power factor correction device (PFC) provides an intermediate circuit voltage; an inverter (INV), which draws its power from the intermediate circuit voltage, outputs power to discharge lamps (LP). According to the invention, an oscillation of the power factor correction device (PFC) only takes place when it is started, by means of a starting device (TRG), by an oscillation of the inverter (INV). This provides cost-effective control of the sequences in the circuit arrangement.

11 Claims, 3 Drawing Sheets

CIRCUIT ARRANGEMENT FOR OPERATING DISCHARGE LAMPS

TECHNICAL FIELD

The invention relates to a circuit arrangement for operating discharge lamps. Of particular interest here are circuit arrangements containing a power factor correction device and an inverter. The invention relates to the coupling of the power factor correction device and the inverter.

BACKGROUND ART

Electronic operating equipment for discharge lamps operated using a mains voltage should only draw a mains current which satisfies the relevant standards. For example, the standard IEC 61000-3-2 sets limits for the amplitudes of the harmonics of the mains current. Electronic operating equipment which contains circuit arrangements having a separate power factor correction device so that they meet the standards for mains current are in widespread use.

The power factor correction device generates an intermediate circuit voltage which supplies power to an inverter. The inverter generates a radiofrequency a.c. voltage which supplies power to the discharge lamps. Radiofrequency here is understood as a.c. voltages having a frequency which is considerably higher than a frequency of the mains voltage.

The power factor correction device and the inverter contain electronic switches which are switched on and off. This causes the power factor correction device and the inverter to oscillate, the power factor correction device oscillating with a power factor correction clock cycle and the inverter oscillating with an inverter clock cycle.

The oscillations of the power factor correction device and the inverter must be started in a targeted manner: A problem arises when starting up the circuit arrangement. When starting up the circuit arrangement, the mains voltage charges a storage capacitor to the peak mains voltage value. This results in high mains current values which can cause interference in the power factor correction device. It is therefore important not to start the oscillation of the power factor correction device until the charging process of the storage capacitor is complete when starting up the circuit arrangement.

Once the power factor correction device has started oscillating, a controlled value for the intermediate circuit voltage is set across the storage capacitor. If the intermediate circuit voltage value, despite being regulated, exceeds a predetermined overvoltage threshold, an overvoltage shutdown must take place. During the overvoltage shutdown, the oscillation of the power factor correction device is interrupted in order to protect components of the circuit arrangement from an overvoltage.

A further problem arises in the event of a fault. A fault may occur if the discharge lamp has reached the end of its life, is defective or is not present. A fault may also occur if an attempt is made to operate a lamp which is unsuitable for the circuit arrangement. In the event of a fault, a fault shutdown must take place which stops the oscillation of the inverter. The fault shutdown protects components of the circuit arrangement from an overload.

If a fault shutdown has occurred, the inverter no longer draws any power from the power factor correction device. It is advantageous that, in the event of a fault shutdown, the oscillation of the power factor correction device is also stopped. The operating equipment as a whole is thus transferred to a shutdown mode which does not draw any power from the mains voltage and has a minimum load on the components.

Circuit arrangements which contain control circuits controlling the oscillation of power factor correction devices and inverters are known. These control circuits increase the complexity, and thereby the costs, of the circuit arrangements.

DISCLOSURE OF THE INVENTION

The object of the present invention is to provide a circuit arrangement for operating discharge lamps, which provides cost-effective control of the oscillation of the power factor correction device and the inverter.

The invention is based on a circuit arrangement which does not contain a control circuit controlling the oscillation of the power factor correction device and the inverter. Rather, the power factor correction device and the inverter may oscillate independently of one another. The oscillation of the power factor correction device is started according to the invention, by means of a starting device, by an oscillation of the inverter.

When starting up the circuit arrangement, the oscillation of the power factor correction device does not start automatically. It is only when the inverter begins oscillating that the oscillation of the power factor correction device is started by means of the starting device. Since the inverter can only begin oscillating when the charging process of the storage capacitor is largely complete, because only then is an intermediate circuit voltage available, no problems arise owing to high mains current values when starting up the circuit arrangement.

The power factor correction device advantageously contains an overvoltage shutdown which stops the oscillation of the power factor correction device when the intermediate circuit voltage exceeds a predetermined overvoltage threshold.

The overvoltage shutdown advantageously operates in a monostable manner. This means that once the overvoltage shutdown has responded, the oscillation of the power factor correction device stops for a given shutdown time. Once the shutdown time has elapsed, the overvoltage shutdown becomes inactive again and the oscillation of the power factor correction device can be started again by means of the starting device. The duration of the shutdown time depends primarily on the decay behavior of the oscillation of the power factor correction device. It must be ensured that the shutdown time lasts until the oscillation of the power factor correction device has decayed. In practice, the value of the shutdown time is at least 100 microseconds.

The inverter advantageously contains a fault shutdown which stops the oscillation of the inverter in the event of a fault.

It is advantageous when the fault shutdown operates in a bistable manner and the overvoltage shutdown operates in a monostable manner. The oscillation of the power factor correction device and of the inverter therefore influence one another as follows: If the overvoltage shutdown responds without a fault being present then, although the oscillation of the power factor correction device is stopped, the inverter continues to function and operates the discharge lamps. Once the shutdown time has elapsed, the power factor correction device is started again. In the event of a fault, the oscillation of the inverter is stopped permanently. Since power is no longer drawn from the power factor correction device, the intermediate circuit voltage increases until the overvoltage shutdown responds. Even after the shutdown time has elapsed, in this case the oscillation of the power factor correction device is no longer started, since the oscillation of the inverter has stopped owing to the fault shutdown. According to the invention, the circuit arrangement thus goes into a shutdown mode in the event of a fault, without a complex control circuit.

For cost reasons, it is advantageous to design the power factor correction device as a self-oscillating step-up converter having a step-up converter switch, a step-up converter inductor and a step-up converter diode. Such a step-up converter is described in the German patent application having the official file reference 10205516.5 of Feb. 8, 2002. With this step-up converter, the voltage across the step-up converter switch forms a feedback variable. A feedback loop which is in principle capable of oscillating is thus closed. According to the invention, however, the step-up converter is dimensioned such that it does not automatically start an oscillation.

The step-up converter is only started, by means of a starting device, by the oscillation of the inverter. According to the invention, the starting device is realized by a trigger capacitor, by means of which the oscillation of the inverter is superimposed on the feedback variable. The oscillation of the inverter thus triggers a first oscillation of the step-up converter, whereupon the latter continues to oscillate automatically. The value of the feedback variable during oscillation is large enough that the starting device can exert no influence on it.

For cost reasons, it is advantageous to design the inverter as a half-bridge inverter. Particularly cost-effective are known self-oscillating half-bridge inverters.

A half-bridge inverter provides a radiofrequency a.c. voltage at its output. The tie point of the two half-bridge switches of the half-bridge inverter forms its output. There, the oscillation of the inverter can be tapped off for the starting device.

A first terminal of the trigger capacitor is accordingly coupled to the tie point of the two half-bridge switches. When using a self-oscillating step-up converter, a second terminal of the trigger capacitor is coupled, according to the invention, to the feedback variable of the self-oscillating step-up converter so that an oscillation of the step-up converter is triggered. Therefore, the second terminal of the trigger capacitor is coupled, according to the invention, to the tie point of the step-up converter inductor and the step-up converter diode.

BRIEF DESCRIPTION OF THE DRAWINGS

The invention will now be explained in more detail below using exemplary embodiments with reference to drawings, in which.

In the text which follows, resistors are designated by the letter R, transistors by the letter T, diodes by the letter D, tie points by the letter J, capacitors by the letter C, inductors by the letter L, in each case followed by a number. In addition, identical and functionally identical elements of the various exemplary embodiments will be referred to below using the same reference symbols throughout.

BEST MODE FOR CARRYING OUT THE INVENTION

Figure 1:
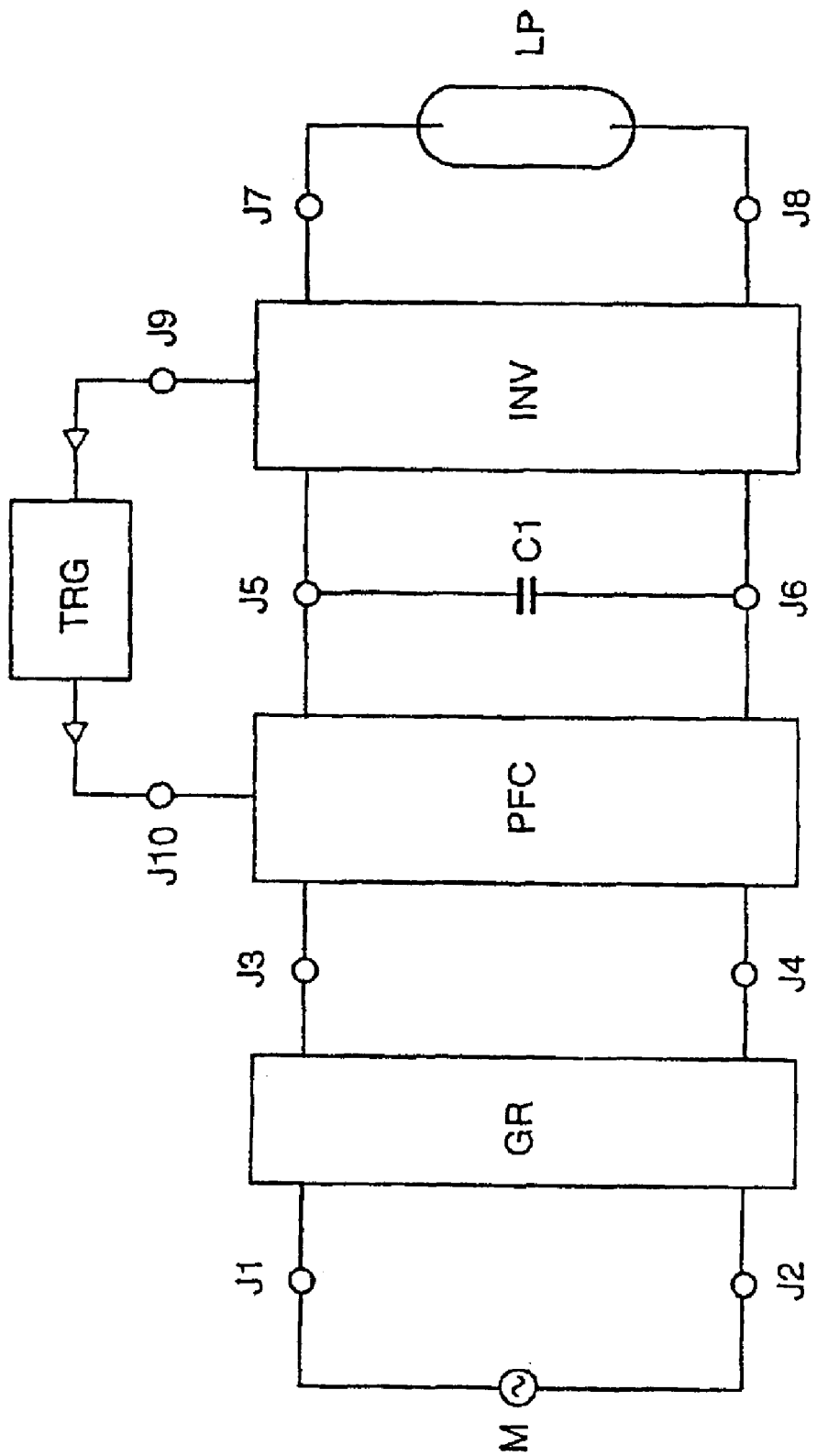
FIG. 1 shows a block circuit diagram of a circuit arrangement according to the invention.

FIG. 1 shows a block circuit diagram of a circuit arrangement according to the invention. A mains voltage source M supplies, via the tie points J1 and J2, a mains voltage to a block GR. The block GR contains a rectifier and may contain means for filtering radio interference.

The block GR provides a rectified mains voltage at the tie points J3 and J4. This voltage is supplied to the block PFC. The block PFC contains a power factor correction device. The topology may be any which is known from the literature. For example, a step-up converter, step-down converter or SEPIC topology may be used. Essential to the invention is the fact that the power factor correction device does not begin to oscillate automatically when a mains voltage is applied to J3 and J4. The block PFC has, according to the invention, a tie point J10. The oscillation of the power factor correction device is started via J10. Once started, the power factor correction device can oscillate automatically. A start signal need not be permanently present at J10.

The block PFC provides an intermediate circuit voltage across a storage capacitor C1 via the tie points J5 and J6. The intermediate circuit voltage supplies power for a block INV. This block contains an inverter which converts the power drawn from the intermediate circuit voltage into a form as required for operating one or more discharge lamps LP. A discharge lamp LP is connected to the block INV via the tie points J7 and J8. The discharge lamp LP represents high- and low-pressure discharge lamps. A plurality of lamps may also be connected with J7 and J8 in series or in parallel. In the case of low-pressure discharge lamps having heatable electrode filaments, even more terminals may be provided for the lamps.

Essential to the invention is the fact that the block INV has a tie point J9 at which it can be established when the inverter is oscillating in the block INV. For example, a logic signal of an oscillator module can be output via J9. In the simplest case, the oscillation of the inverter itself is applied to J9.

The signal at J9 is fed, according to the invention, to a first terminal of a starting device TRG. A second terminal of the starting device TRG is connected to the tie point J10, via which an oscillation of the power factor correction device can be started. In FIG. 1, arrows indicate the signal flow direction of the starting device from J9 to J10.

In the simplest case, the starting device merely comprises an electric connecting line. This is only possible when the block INV supplies a signal to J9 which is directly suitable for starting an oscillation of the power factor correction device. In most applications, however, the starting device must match the signal at J9 in order for the oscillation of the power factor correction device to be started according to the invention via J10. This can mean that the signal at J9 must be amplified, attenuated or filtered. The signal at J10 must be strong enough for it to be possible to start the oscillation of the power factor correction device. It should not be so strong that it influences the started oscillation. In addition, the performance of a start which contradicts the idea of the invention must be excluded.

Figure 2:
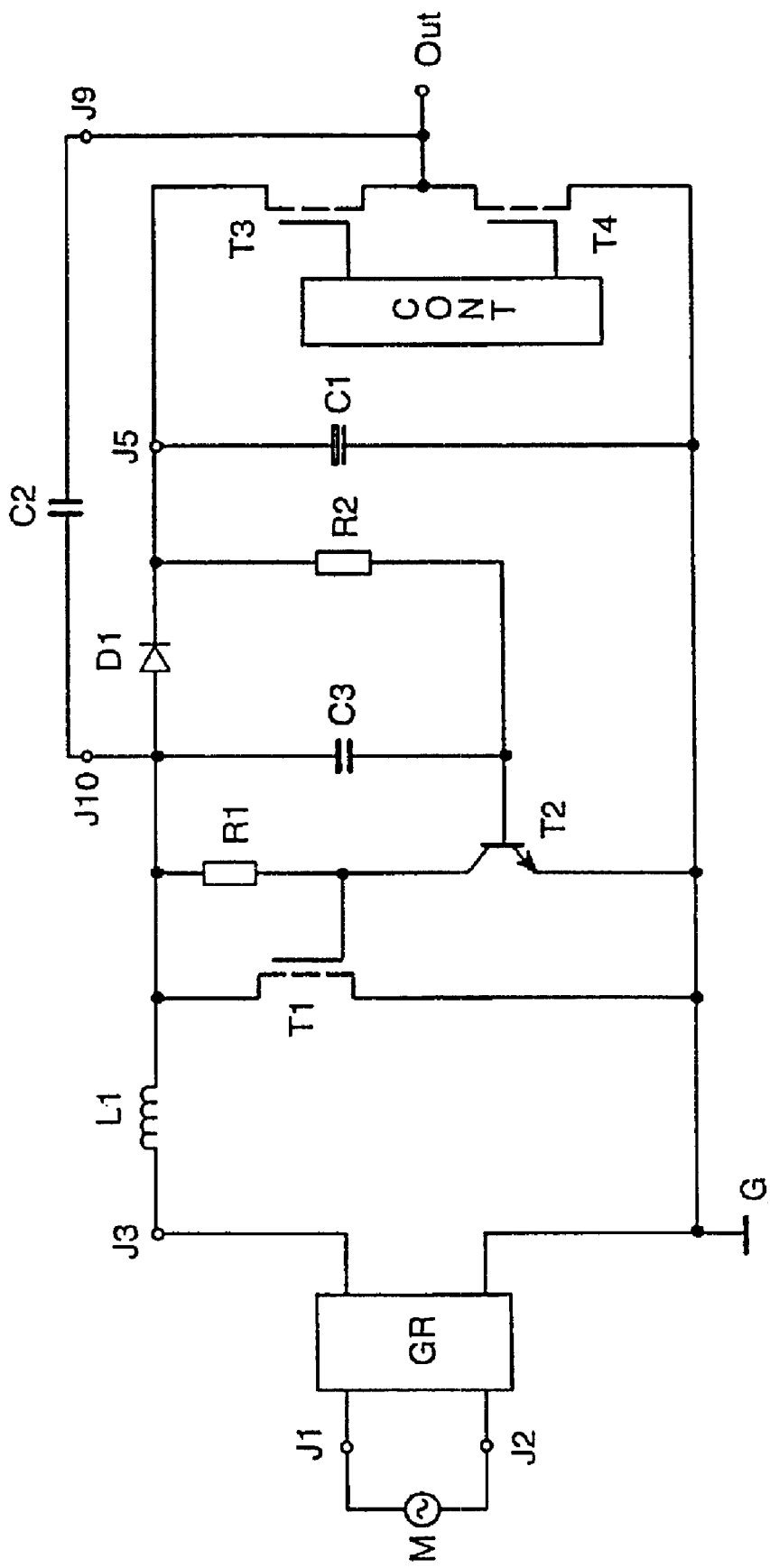
FIG. 2 shows the circuit diagram of an exemplary embodiment of a circuit arrangement according to the invention.

FIG. 2 shows a circuit diagram of an exemplary embodiment of a circuit arrangement according to the invention. In comparison with FIG. 1, the tie points J4 and J6 are combined to form a ground potential G. The block GR supplies a rectified mains voltage to J3 in relation to the ground potential G.

An inductor L1, transistors T1 and T2, resistors R1 and R2, a capacitor C3 and a diode D1 form a self-oscillating step-up converter as is described in the German patent application having the official file reference 10205516.5 of Feb. 8, 2002. Here, T1 forms the step-up converter switch, L1 the step-up converter inductor and D1 the step-up converter diode.

A first terminal of L1 is connected to J3. A second terminal of L1 is connected to the tie point J10 which forms a start input to the step-up converter. T1 is designed as a MOSFET, the channel of which is connected between J10 and the ground potential G. The gate of T1 is connected to J10 via the resistor R1. The gate is also connected to the collector of the transistor T2, which is designed as a bipolar transistor. The emitter of T2 is connected to the ground potential G. The base of T2 is connected to J10 via the capacitor C3. The base of T2 is also connected to a tie point J5 via the resistor R2. A storage capacitor C1 is connected between J5 and the ground potential G. An intermediate circuit voltage is thus applied to J5, related to the ground potential G. The diode D1 is connected to J10 with its anode and to J5 with its cathode.

The series circuit of two half-bridge transistors T3 and T4 is connected to the intermediate circuit voltage. The gate terminals of T3 and T4 are driven by a block CONT. The block CONT may contain a radiofrequency oscillator which switches T3 and T4 alternately on and off. It is also possible for the block CONT to receive a half-bridge feedback signal and, as a function of this, to switch the transistors T3 and T4 alternately on and off. In this case, the block CONT, T3 and T4 form a self-oscillating half-bridge inverter.

A radiofrequency a.c. voltage with respect to the ground potential G is present at the tie point Out of T3 and T4 when the half-bridge inverter is oscillating. This radiofrequency a.c. voltage supplies power for a discharge lamp LP via known lamp circuits, not shown.

The tie point Out is connected to the tie point J9. The oscillation of the half-bridge inverter is thus present in the form of a radiofrequency a.c. voltage at J9. J9 is connected to J10 via a trigger capacitor C2. The comparison with FIG. 1 shows that the starting device is realized, in the application example in FIG. 2, by the trigger capacitor C2.

When starting up the circuit arrangement, T2 is first driven via C3 and, once the intermediate circuit voltage has built up, via R2 as well. The gate of T1 is thus connected to the ground potential G via T2. An oscillation of the self-oscillating step-up converter is thus not started. When the charging process of the storage capacitor is largely complete, the intermediate circuit voltage reaches a value which permits an oscillation of the half-bridge inverter. This oscillation reduces the base emitter voltage of T2 via the capacitors C2 and C3. T2 switches off, and T1 can be switched on via R1.

The automatic oscillation of the power factor correction device is thus started. The amplitude of the voltage fluctuation across J10 is, after T1 is switched on for the first time, so large that an automatic oscillation of the power factor correction device is maintained via the feedback through C3. The amplitude of the voltage fluctuation at J10 when the power factor correction device is oscillating is also so large that the voltage injected at J10 via C2 is negligible.

According to the invention, the oscillation of the power factor correction device only begins once the charging process of the storage capacitor is largely complete when starting up the circuit arrangement. The problems described above are avoided owing to high charging currents.

Figure 3:
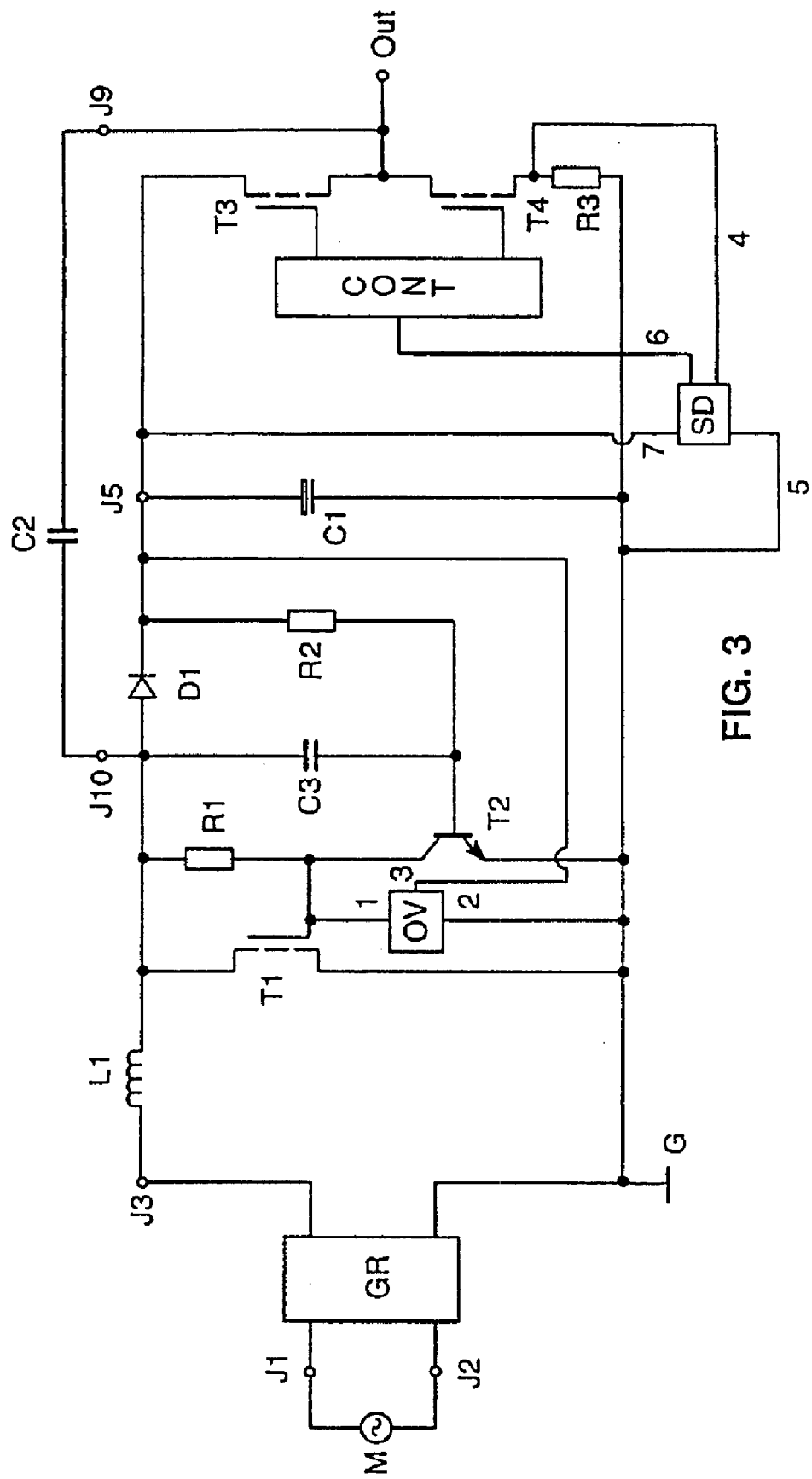
FIG. 3 shows the circuit diagram of a further exemplary embodiment of a circuit arrangement according to the invention.

FIG. 3 shows the circuit diagram of a further exemplary embodiment of a circuit arrangement according to the invention. In comparison with FIG. 2, the circuit diagram in FIG. 3 is supplemented by an overvoltage shutdown OV and a fault shutdown SD.

The overvoltage shutdown OV detects the intermediate circuit voltage, using its terminals 3 and 2. The terminal 1 is connected to the gate of T1. If the intermediate circuit voltage exceeds a predetermined overvoltage threshold, the gate of T1 is connected to the ground potential G via the terminals 1 and 2. The oscillation of the power factor correction device is thus stopped.

According to the invention, the connection between the gate of T1 and the ground potential G is cleared again after a shutdown time has elapsed by means of the overvoltage shutdown OV. If, once the shutdown time has elapsed, the half-bridge inverter oscillates, it starts the oscillation of the power factor correction device again, via C2.

In contrast to FIG. 2, the half-bridge transistor T4 in FIG. 3 is connected to the ground potential G via a measurement shunt R3. The voltage drop across R3 is a measure of the current in the half-bridge. As is known from the literature, faults may be derived from this. This also occurs in the fault shutdown SD via the terminal 4. It is also possible to derive faults from the voltage across the discharge lamp. For this purpose, this voltage must be fed to the fault shutdown SD.

If the fault shutdown SD detects a fault, it interrupts the oscillation of the half-bridge inverter via the terminal 6. According to the invention, the fault shutdown SD permanently interrupts the oscillation of the half-bridge inverter. Only an external influence can enable the oscillation of the half-bridge inverter again. This can take place, for example, by the mains voltage being interrupted. For this purpose, the fault shutdown SD is connected to the intermediate circuit voltage via the terminals 5 and 7. The terminals 5 and 7 may also serve the purpose of supplying the operating voltage to the fault shutdown SD. By interrupting the mains voltage, the intermediate circuit voltage is reduced, and the fault shutdown SD is reset. When the intermediate circuit voltage is increased once more, the oscillation of the half-bridge inverter can begin again.

Means may also be provided for permitting a renewed oscillation of the half-bridge inverter when a lamp has been changed.

The permanent interruption of the oscillation of the half-bridge inverter in the exemplary embodiment illustrated leads to a continuous rise in the intermediate circuit voltage. Finally, the value of the intermediate circuit voltage exceeds the overvoltage threshold. The overvoltage shutdown then stops the oscillation of the power factor correction device. This oscillation is also no longer started once the shutdown time has elapsed if the half-bridge inverter does not oscillate again. The circuit arrangement is thus in a shutdown mode.

What is claimed is:

1. A circuit arrangement for operating discharge lamps, comprising:
   a power factor correction device which oscillates with a PFC clock cycle and provides an intermediate circuit voltage,
   an inverter which oscillates with an inverter clock cycle which is independent of the PFC clock cycle, draws its power from the intermediate circuit voltage and is capable of outputting power to discharge lamps wherein, an oscillation of the power factor correction device is started, by means of a starting device, by an oscillation of the inverter.

2. The circuit arrangement as claimed in claim 1, comprising an overvoltage shutdown which stops the oscillation of the power factor correction device when the intermediate circuit voltage exceeds a predetermined overvoltage threshold.

3. The circuit arrangement as claimed in claim 2, comprising a fault shutdown which stops the oscillation of the inverter in the event of a fault.

4. The circuit arrangement as claimed in claim 2, where the overvoltage shutdown operates in a monostable manner.

5. The circuit arrangement as claimed in claim 3, where the overvoltage shutdown operates in a monostable manner and the fault shutdown operates in a bistable manner.

6. The circuit arrangement as claimed in claim 4, where the overvoltage shutdown stops the power factor correction device for at least 100 microseconds when the intermediate circuit voltage exceeds a predetermined overvoltage threshold.

7. The circuit arrangement as claimed in claim 1, where the power factor correction device is a self-oscillating step-up converter having a step-up converter switch, a step-up converter inductor and a step-up converter diode, the voltage across the step-up converter switch forming a feedback variable.

8. The circuit arrangement as claimed in claim 7, where the output of the inverter is capacitively coupled to the feedback variable.

9. The circuit arrangement as claimed in claim 8, where the inverter is a half-bridge inverter having two half-bridge switches (T3, T4), the tie point of the half-bridge switches (T3, T4) being coupled to the tie point of the step-up converter inductor and the step-up converter diode via a trigger capacitor.

10. The circuit arrangement as claimed in claim 9, where the half-bridge inverter is self-oscillating.

11. The circuit arrangement as claimed in claim 5, where the overvoltage shutdown stops the power factor correction device for at least 100 microseconds when the intermediate circuit voltage exceeds a predetermined overvoltage threshold.

* * * * *